United States Patent [19]
Wakabayashi

[11] Patent Number: 5,778,266
[45] Date of Patent: Jul. 7, 1998

[54] DATA TRANSCRIBING DEVICE FOR CAMERA

[75] Inventor: Tsutomu Wakabayashi, Kanagawa-ken, Japan

[73] Assignee: Nikon Corporation, Tokyo, Japan

[21] Appl. No.: 859,777

[22] Filed: May 21, 1997

Related U.S. Application Data

[63] Continuation of Ser. No. 355,255, Dec. 9, 1994, abandoned.

[30] Foreign Application Priority Data

Dec. 22, 1993 [JP] Japan .................................. 5-324831

[51] Int. Cl.$^6$ .............................. G03B 17/24; G03B 3/00
[52] U.S. Cl. ........................... 396/315; 396/301; 396/303
[58] Field of Search ........................ 396/277, 279, 396/281, 301, 303, 310, 315, 316, 317, 318

[56] References Cited

U.S. PATENT DOCUMENTS

| | | | |
|---|---|---|---|
| 4,074,294 | 2/1978 | Fujita et al. | 354/106 |
| 5,119,119 | 6/1992 | Amano et al. | 354/106 |
| 5,245,373 | 9/1993 | Ogawa et al. | 354/106 |
| 5,382,993 | 1/1995 | Hozumi et al. | 354/106 |
| 5,398,088 | 3/1995 | Yamazaki et al. | 354/106 |

FOREIGN PATENT DOCUMENTS

| | | |
|---|---|---|
| 53-86266 | 7/1978 | Japan . |
| 63-216037 | 9/1988 | Japan . |
| 1-51170 | 11/1989 | Japan . |

*Primary Examiner*—Safet Metjahic
*Assistant Examiner*—Nicholas J. Tuccillo
*Attorney, Agent, or Firm*—Oliff & Berridge, PLC

[57] ABSTRACT

A data transcribing device for a camera includes structure to adjust the threshold voltage of an external display to be higher than the threshold voltage of the transcribing structure to easily check the battery voltage through the external data display and to prevent data transcription failures when the battery voltage drops. The data transcribing device includes a battery power source, a data transcribing display, and an external display powered by the battery power source. When the data transcribing display includes a light emitting source powered by the battery power source and a component other than the light emitting source that is not powered by the battery power source, or when the data transcribing display consists of only the light emitting source (such as, e.g., an LED), the driving threshold level of the external display is set to be higher than the driving threshold level of the light emitting source. When the data transcribing display includes the light emitting source and a component powered by the battery power source (such as, e.g., a transcribing LCD), the driving threshold level of the external display is set to be higher than the driving threshold levels of the component and of the light emitting source.

19 Claims, 7 Drawing Sheets

DATA TRANSCRIBING DEVICE FOR CAMERA

This is a Continuation of application Ser. No. 08/355,255 filed Dec. 9, 1994 now abandoned.

BACKGROUND OF THE INVENTION

1. Field of the Invention

The present invention relates to a data transcribing device for a camera that transcribes data, such as, for example, the date of photography, onto the film in the camera.

2. Description of Related Art

A prior art device that transcribes data onto film, as shown in Japanese Patent Publication No. 1-51170, comprises a battery power source, a liquid crystal device for data transcription that is powered by the battery power source, and a liquid crystal device to be used as an external display. The driving threshold level of the liquid crystal device for the external display is set to be higher than the driving threshold level of the liquid crystal device for data transcription.

According to this construction, when the voltage that is impressed to the external display liquid crystal device by the battery power source falls below the driving threshold level of the external display liquid crystal device, the characters on the display of the external display liquid crystal device become faint and difficult to see. At this point the user is made aware of the fact that the data transcription process may not be possible (due to low battery condition), because the display characters of the external display liquid crystal device become faint and difficult to see.

With the data transcription device for a camera described above, as shown in the Japanese publication, a light source lamp is provided in the data transcription device for emitting light through the data transcription liquid crystal device. The data is recorded onto the film by light from the lamp that has passed through the data transcription liquid crystal device.

The amount of light emitted by the light source lamp also depends on the strength of battery power source. A long-life, button style, lithium battery may be used as the battery power source. The driving threshold level of the light source lamp is set higher than the driving threshold level of the external display liquid crystal device. However, this may result in the following problems.

When the voltage impressed upon the light source lamp by the battery power source drops below the driving threshold of the light source lamp, the lamp emits less light and it becomes impossible to transcribe the data onto the film. When that impressed voltage, even though too low for transcription, is higher than the driving threshold level of the external display liquid crystal device, errors will occur if the photographer does not notice that the battery voltage has dropped because the display of the external display liquid crystal device is virtually normal.

SUMMARY OF THE INVENTION

Therefore, it is an object of embodiments of the present invention, in light of the above-mentioned problems, to easily check the battery power source voltage through the external data display and to prevent data transcribing failures caused by a drop in the battery voltage.

In the disclosed embodiments of the present invention, when the data transcribing device includes a data transcription liquid crystal device driven by a battery power source and including a light emitting device such as a light source lamp for passing light through the data transcription liquid crystal device, driving threshold level of the external display device is set to be higher than the driving threshold levels of the data transcription liquid crystal device and of the light emitting device. The display characters become dim and hard to see when the voltage impressed upon the external display device by the battery power source drops. Therefore, because the driving threshold level of the external display device is higher than the driving threshold levels of the data transcription liquid crystal device and the light emitting device, the dimness of the display characters of the external display device indicates that the power source battery should be replaced before transcription failure occurs.

When the data transcribing device has only a light emitting device (for example, when the transcribing configuration is formed through a plurality of light-emitting diodes), or when data-defining components are included that are not powered by the light emitting device or by the above-mentioned battery power source (for example, when the data transcribing device is constructed from a data board on which only the data portion is light transmissive, which is used with a lamp or a light emitting diode on the same data board), the driving threshold level of the external display device is set higher than the driving level of the light emitting device.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
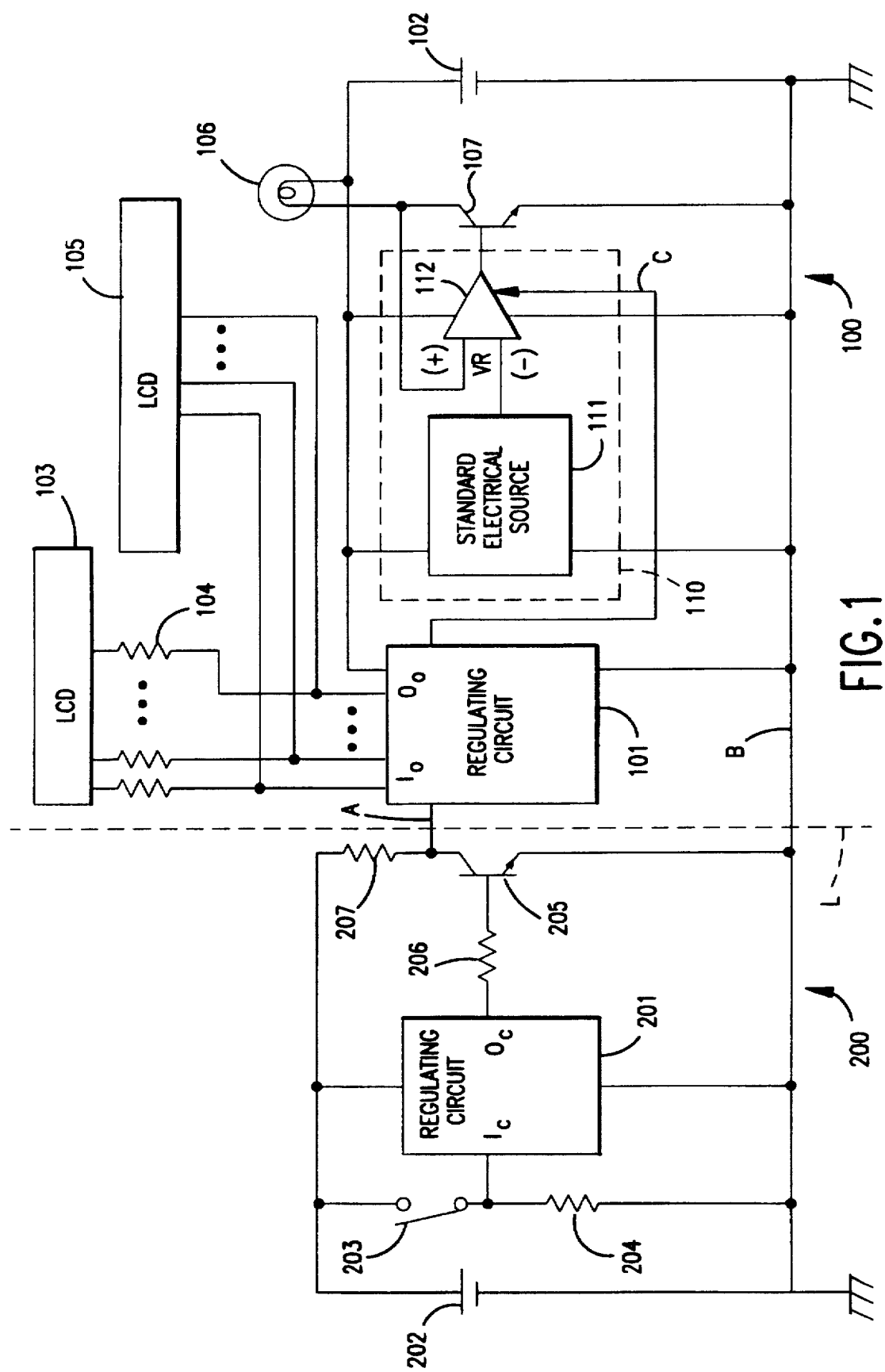
FIG. 1 is a block diagram of an embodiment of the present invention.

FIG. 1 is a block diagram relating to an embodiment of the present invention. To the right of the dashed line L in the middle of the diagram is a block diagram showing the construction of a data transcribing device 100 attached to the rear cover of a camera 200. To the left of line L is a block diagram showing the internal construction of the camera 200.

Figure 3:
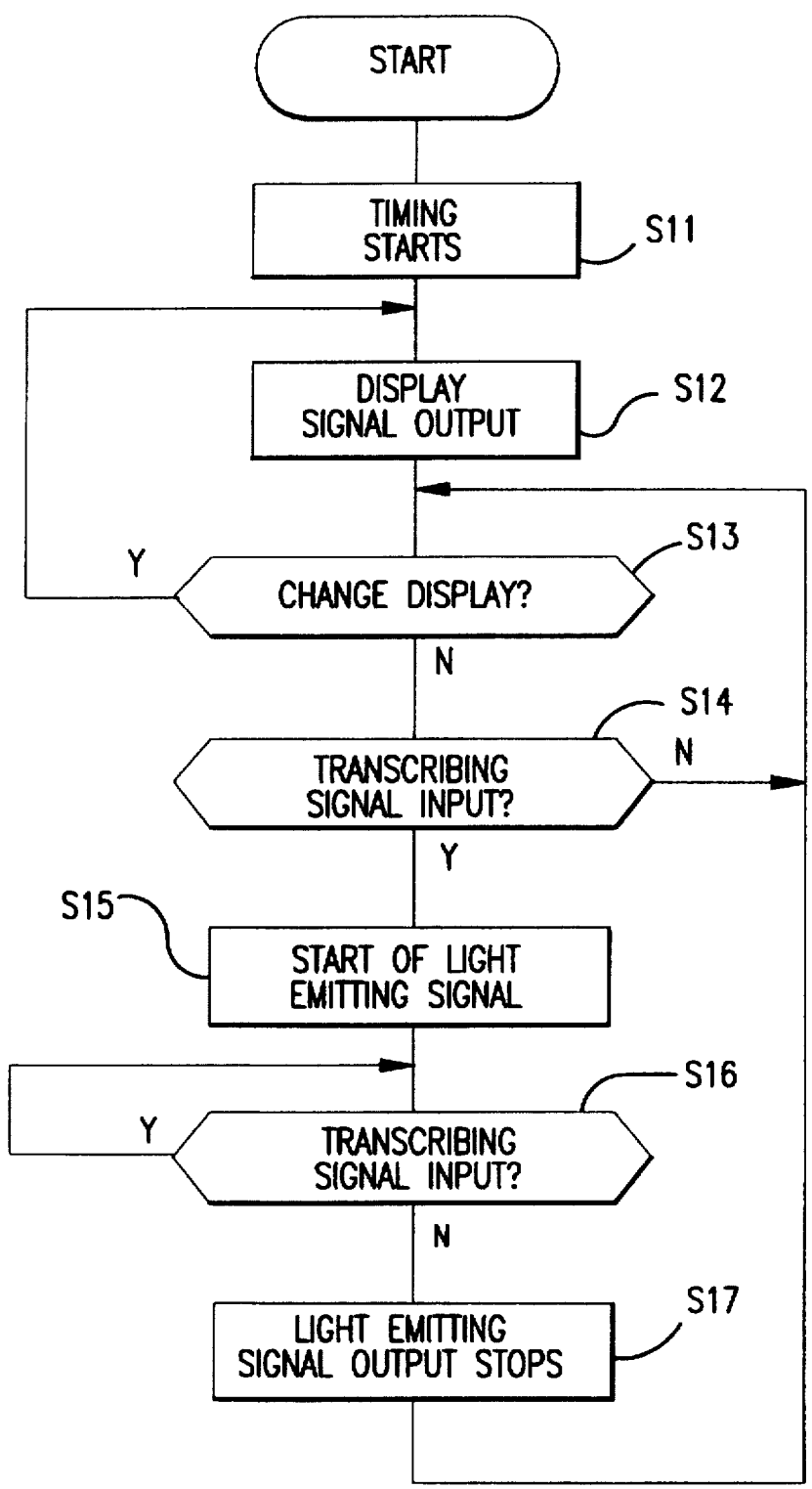
FIG. 3 is a flow chart showing the operating sequence of a camera regulating circuit of FIG. 1.

In FIG. 1, a regulating circuit 101 for the data transcribing device 100 is powered by the battery power source 102, and operates sequentially as shown by the flow chart of FIG. 3. A transcribing signal from the camera 200 is input through the input port $I_o$ of the regulating circuit 101, and a light emitting signal is output from the output port $O_o$ of the regulating circuit 101. Furthermore, the camera 200 and the data transcribing device 100 are electrically connected by transcribing signal line A and ground line B.

A liquid crystal device 103 provides an external display, displaying data such as the date based on a display signal output by the regulating circuit 101 via a resistor 104.

A liquid crystal device 105 for transcribing displays data such as the date based on a display signal output by the regulating circuit 101. The liquid crystal device 105, along with a transcribing lamp 106, which will be described hereafter, comprises the data transcribing device, which transcribes data, such as, for example, the date on film in the camera.

One terminal of the lamp 106 is connected to the positive terminal of the battery power source 102, and the other terminal is connected to the collector of the NPN transistor 107, which is grounded through its emitter.

A drive circuit 110 comprises a standard electrical source 111 and an operational amplifier (op amp) 112. The standard power source 111 is powered by the battery power source 102, and outputs a standard voltage VR, which is generated in the positive terminal side of the battery source 102, to the negative terminal of the op amp 112. The op amp 112 is powered by the battery power source 102, and is connected to the output port $O_o$ of the regulating circuit 101 via the control line C. The output of output port $O_o$ regulates the OFF/ON state of the op amp 112. The output of the op amp 112 is connected to the base of a transistor 107.

When the output port $O_o$ of the regulating circuit 101 is changed to a high-level state, a light emitting signal is input from the regulating circuit 101 to the op amp 112 via the control line C. The op amp 112 turns on and stays on only during the input of the light emitting signal, causing the lamp 106 to emit light only during this input interval.

Figure 2:
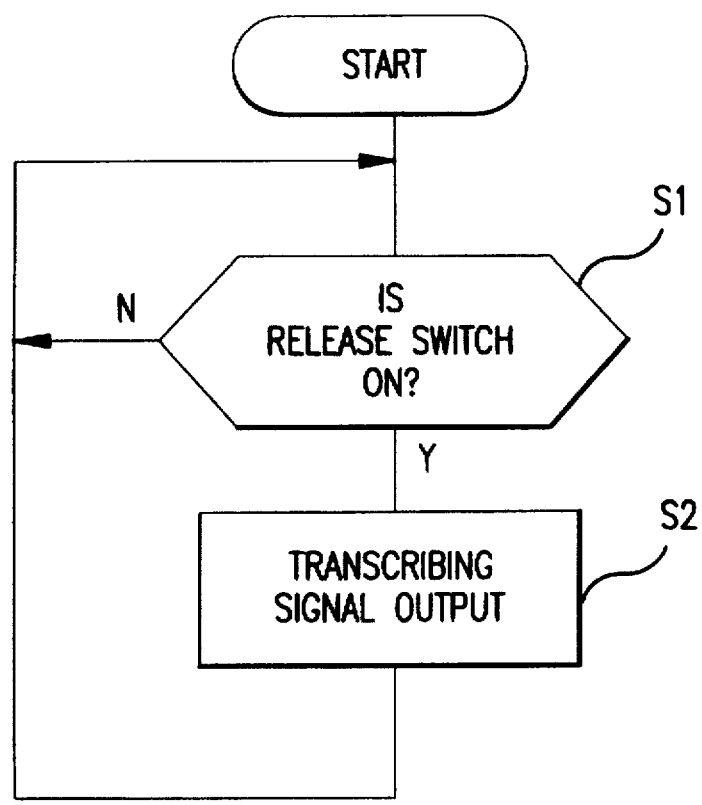
FIG. 2 is a flow chart showing the operating sequence of a transcribing device regulating circuit of FIG. 1.

The regulating circuit 201 of the camera 200 is powered by the battery power source 202, and operates sequentially as shown in the flow chart of FIG. 2. A release switch 203 is turned on by depressing a release button (not shown) on the outer casing of the camera and turned off by releasing the release button. One terminal of the release switch 203 is connected to the positive terminal of the battery power source 202, and the other terminal is connected to the input port $I_c$ of the regulating circuit 201. The input port $I_c$ is also connected to one end of a resistor 204, and the other end of the resistor 204 is grounded.

An NPN transistor 205 has its emitter grounded, and its collector connected to one end of a resistor 207. The other end of the resistor 207 is connected to the positive terminal of the battery power source. The base of the NPN transistor 205 is connected to the output port $O_c$ of the regulating circuit 201 via a resistor 206.

The camera 200 operates as follows.

FIG. 2 is a flow chart showing the operational sequence of the regulating circuit 201 of the camera 200. When the battery power source 202 is installed into the camera 200 the program starts. The regulating circuit determines, by the high-level or low-level state of the input port $I_c$ of the regulating circuit 201, whether the release switch 203 is on or off respectively, as shown in step S1, based upon whether the release button is depressed.

If the release switch 203 is off, the input port $I_c$ is at the low-level state, and the release button is determined to be not depressed. Then the procedure stops at step S1. If the release switch 203 is on, the input port $I_c$ is at the high-level state, the release button is determined to be depressed. Then the procedure moves to step S2, and the output port $O_c$ is switched to the high-level state for a fixed interval and outputs a transcribing signal. At this point, photography is carried out by a photographic device (not shown). The procedure then returns to step S1, completing the operation of camera 200 but not data transcribing device 100.

The switching of the output port $O_c$ to the high-level state produces a transcribing signal output. The transistor 205 is turned on by the output transcribing signal which is input to the base of the transistor 205. The input port $I_o$ of the regulating circuit 101 is switched from the high-level state to the low-level state via the collector signal from transistor 205 passing through the transcribing signal line A. The switching of the input port $I_o$ to the low-level state will hence be referred to as the transcribing signal input.

FIG. 3 is a flow chart showing the operational sequence of the regulating circuit 101 of the data transcribing device 100. The action of the data transcribing device 100 is described with reference to this flow chart.

When the battery power source 102 is installed into the data transcribing device 100, the program starts and the regulating circuit 101 commences timing as shown in step S11 of FIG. 3. Proceeding to step S12, a display signal is output to the external display liquid crystal device 103 and to the transcribing liquid crystal device 105. The output of this display signal is maintained until the output of the next display signal. The external display liquid crystal device 103 and the transcribing liquid crystal device 105 carry out a set display based on the display signal.

Advancing to step S13, the program determines, through the timing of step S11, whether it is necessary to switch the display. If it is necessary to switch the display, the program returns to step S12 and outputs a new display signal to the liquid crystal devices 103 and 105. If it is not necessary to switch the display, the program advances to step S14 and determines by the high-level or low-level state of the input port $I_o$ whether the transcribing signal is being input.

If it is determined that the input port $I_o$ is in the high-level state, indicating that a transcribing signal is not being input, the program returns to step S13. If it is determined that the input port $I_o$ is in the low-level state, indicating that a transcribing signal is being input, the program advances to step S15 and a light emitting signal is output to the op amp 112 via the control line C by the switching of the output port $O_o$ to the high-level state.

The op amp 112 is turned on by the light emitting signal, the drive circuit 110 operating in a manner such that the standard voltage VR generated in the standard power source 111 toward the positive terminal side of the battery power source 102 is the same as the voltage impressed upon the lamp 106.

The lamp 106 starts to emit light by the addition of the standard voltage VR when the transistor 107 is turned on by the switching on of the op amp 112. The passage (transmission) of light through the transcribing liquid crystal device 105 commences the transcription of the data to film.

Advancing to step S16, a determination is made, in the same manner as in step S14, whether the transcribing signal is being input. If the transcribing signal is being input, the program stops at step S16; if the transcribing signal is not being input, the program advances to step S17 and stops the output of the light emitting signal by switching the output port $O_o$ to the low-level state. Since the op amp 112 stops inputting the light emitting signal via control line C when the output of the light emitting signal stops, the op amp switches off and the output level becomes the same as the level on the minus side of the battery power source 102, turning the transistor 107 off. The lamp 106 stops emitting light and the data transcription is finished.

The program then returns to step S13, the steps described above representing the action of the data transcribing device 100. Next, when the release switch 203 of the camera 200 is turned on, at the same time that photography is being performed, a transcribing signal output from the camera 200 side is input to the data transcribing device 100 side, and data transcription to film is carried out.

The action in which the voltage impressed upon the lamp 106 by the drive circuit 110 and the standard voltage VR become the same when the lamp 106 is emitting light is described in detail in Japanese Laid-Open Patent Application No. 63-216037. According to this Japanese publication, the difference between the voltage impressed upon the lamp by the op amp and the standard voltage VR is continually revised while the op amp is on. When the voltage impressed upon the lamp and the standard voltage VR are at the same level and the lamp emits light, the standard voltage VR may be set so that the drive circuit stabilizes and operates under conditions in which the generating voltage capacity of the battery power source is lowered, for example, when the battery is 80% discharged. The voltage impressed upon the lamp for light emitting may be maintained uniformly within the range from the higher generating voltage of the battery during the initial period of use to the lowered condition to maintain the amount of light emitted at a constant level.

Figure 4:
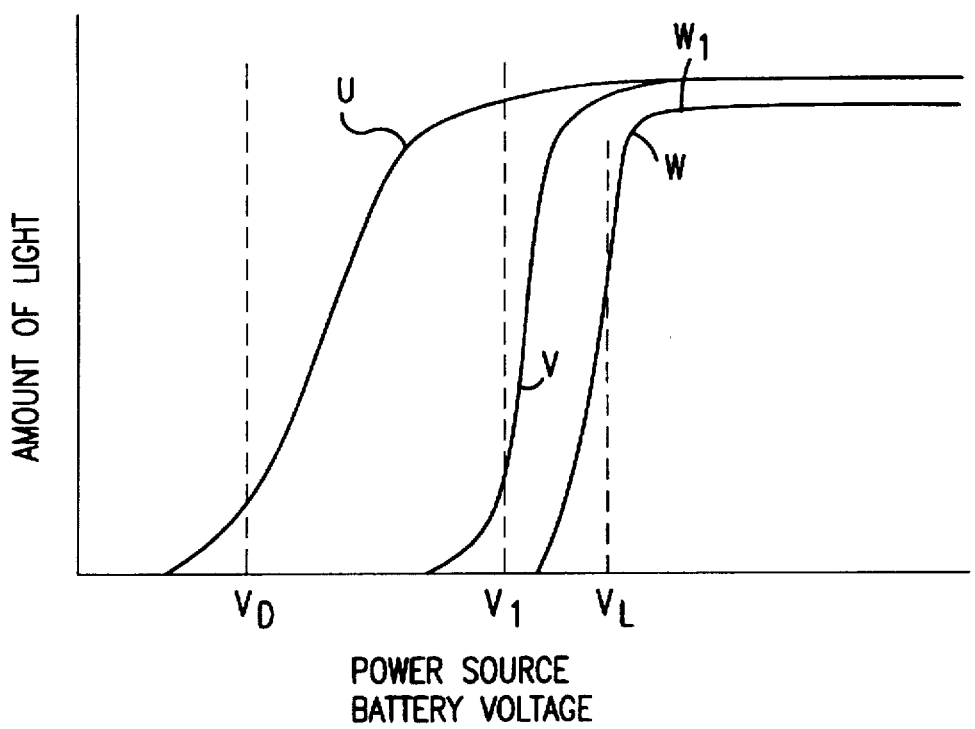
FIG. 4 is a graph showing the relationship of each liquid crystal device and of the lamp to the voltage of the battery power source in a device that does not practice the invention.

The operating characteristics of the external display liquid crystal device 103, the transcribing liquid crystal device 105, and the lamp 106 with respect to the voltage of the battery power source 102 are described hereafter, with reference to FIG. 4.

FIG. 4 is a graph showing the relationships between the impressed voltage of the battery power source 102 and the amount of light emitted by the lamp 106, the amount of light permeability (transmissiveness) of the transcribing liquid crystal device 105, and the amount of light reflected by the external display liquid crystal device 103. The FIG. 4 graph assumes that resistor 104 (see FIG. 1) is not present.

The curved line U in FIG. 4 is a characteristic line showing the relationship between the amount of light permeability of the transcribing liquid crystal device 105 and the voltage of the battery power source 102. The curved line V is a characteristic line showing the relationship between the amount of light reflected by the external display liquid crystal device 103 (i.e., without the use of resistor 104) and the voltage of the battery power source 102. The curved line W is a characteristic line showing the relationship between the amount of light emitted by the lamp 106, the impressed voltage of which is regulated by the drive circuit 110, and the driving voltage of the battery power source toward the drive circuit 110.

The nearly straight, horizontal portion of curve V on the right side of FIG. 4 shows the maximum amount (saturation amount) of reflected light of the external display liquid crystal device 103. The external display liquid crystal device is effective (i.e., can be easily read) even when the amount of reflected light is as low as 10% of the maximum, saturation amount of reflection. The voltage level of the battery power source 102 at the point where the reflected light is 10% of the maximum, saturation amount is referred to as the threshold voltage $V_1$, and is shown in the middle of FIG. 4. When the voltage level of the battery power source drops below $V_1$, the amount of light reflected from the external display liquid crystal device 103 decreases so much that the display becomes dim and difficult to see, or the display becomes virtually invisible.

The nearly straight, horizontal portion of curve U on the right side of FIG. 4 shows the maximum amount (saturation amount) of light that permeates (or is transmitted) through the transcribing liquid crystal device 105. The transcribing liquid crystal display is effective (i.e., transmits sufficient light to form images) even when the amount of transmitted light is as low as 10% of the maximum, saturation amount of light. The voltage level of the battery power source 102 at the point where the transmitted light is 10% of the maximum amount is referred to as the threshold voltage $V_D$. When the battery power source voltage level drops below $V_D$, display of the transcribing liquid crystal device becomes impossible.

The nearly straight, horizontal portion of curve W on the right side of FIG. 4 shows that the generating voltage of the battery power source 102 is limited to the range from the higher generating voltage of the battery at the initial period of use to the lowered condition as described above, and that the amount of light emitted from the lamp 106 through the normal operation of the above-mentioned drive circuit 110 is uniformly maintained. When the voltage of the battery power source 102 drops below the lowered condition described above, the drive circuit 110 no longer operates normally, and the impressed voltage from the drive circuit 110 to the lamp 106 also drops. Thus, the amount of light emitted by the lamp 106 is also reduced, and the curved line W drops off to the left in a steep curve from point $W_1$.

The lamp is effective (i.e., emits sufficient light to form images on film) even when the amount of emitted light is 50% of the maximum emission amount. The voltage level of the battery power source at the point where 50% of the maximum amount of light is emitted is referred to as the threshold voltage $V_L$. When the battery power source voltage drops below $V_L$ the amount of light emitted from the lamp becomes too small and transcription becomes impossible.

The driving threshold voltage of the drive circuit 110 when the drive circuit 110 no longer operates normally may also be thought of as being equal to a voltage that corresponds to point $W_1$ on curved line W.

The relationship of the driving threshold voltage $V_1$ of the external display liquid crystal device 103 and the threshold voltage $V_L$ of the lamp 106 will now be described.

As described above, when resistor 104 in FIG. 1 is not provided, the threshold voltage $V_L$ of the lamp 106 is higher than the threshold voltage $V_1$ of the external display liquid crystal device 103, as shown in FIG. 4. If the voltage of the battery power source 102 drops below the threshold voltage $V_L$ of the lamp 106, the amount of light emitted by the lamp 106 decreases and data transcription becomes impossible. If the voltage of the battery source 102 is higher than the threshold voltage $V_1$ of the external display liquid crystal device 103, since the display of the external display liquid crystal device 103 is almost normal, regardless of whether data can be transcribed, the photographer does not notice the drop in the voltage of the battery power source from viewing the external display liquid crystal device, and a mistake is made in that the data is ineffectively transcribed.

With the present invention, as described in FIG. 1, the threshold voltage of the external display liquid crystal device 103 is changed from $V_1$ to $V_2$ (see FIG. 5), wherein $V_2 > V_1$, by the placement of the resistor 104 in the path of the display signal input component of the external display liquid crystal device 103.

Specifically, for example, as described in detail in Japanese Patent Publication No. 53-86266, when a resistor is inserted in series with the liquid crystal segments, and when compared with segments into which a resistor is not inserted, the voltage supplied to the elements having a resistor is lowered, and this voltage drop causes a decrease in the contrast of such display elements.

In other words, it is shown that by adding a resistor, the contrast becomes lower for the same battery voltage. In the present embodiment, a resistance is provided between the power source and the external liquid crystal display to reduce the voltage level supplied thereto, which reduces the amount of light reflected from the external display liquid crystal device 103. In essence, this causes the curved line V in the middle of FIG. 4 to move to the right side of the curved line W. A suitable resistance value is selected for the display signal input component of the external display liquid crystal device 103 to obtain the voltage vs. light amount characteristics shown in FIG. 5 by adding a resistor 104 as shown in FIG. 1.

Figure 5:
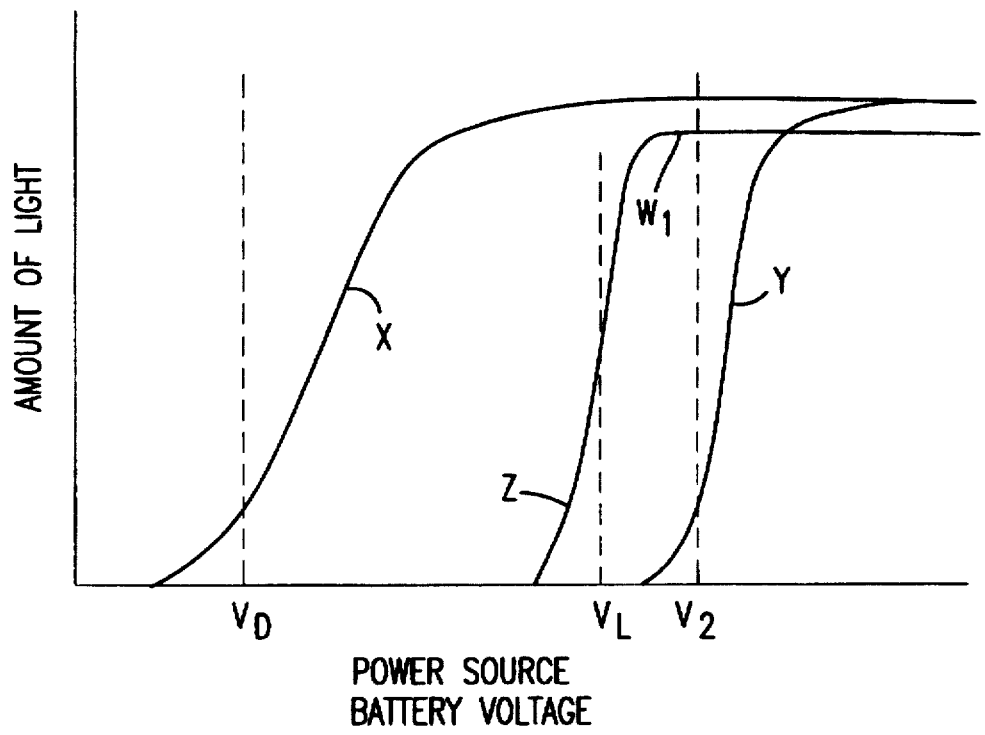
FIG. 5 is a graph showing the case in which the curved line V of FIG. 4 is moved to the right of the separate curved line W, and the driving threshold level of the external display liquid crystal device is higher than the driving threshold levels of the transcribing liquid crystal device and of the lamp in accordance with the invention.

The curved line X in FIG. 5 is a characteristic line showing the relationship between the amount of light permeating the transcribing liquid crystal device 105 and the voltage of the battery power source 102. The curved line Y is a characteristic line that corresponds to the curved line V of FIG. 4 and shows the relationship between the light reflection amount of the external display liquid crystal device when the resistor 104 is inserted and the voltage of the battery power source 102. The curved line z is the same line as the curved line W of FIG. 4, and is a characteristic line showing the relationship between the amount of light emitted by the lamp 106, the impressed voltage of which is regulated by the drive circuit 110, and the voltage of the battery power source 102. Point $W_1$ on this line Z is the same as point $W_1$ of FIG. 4, and corresponds to the driving threshold level of the drive circuit 110.

The voltage level of the battery power source 102 at which 10% of the maximum amount of light is reflected by the external display liquid crystal device (i.e., the threshold voltage) is $V_2$. The values $V_D$ and $V_L$ are the same as in FIG. 4.

As can be seen from FIG. 5, when the resistor 104 is inserted and the voltage of the battery power source 102 drops below the threshold voltage $V_2$ of the external display liquid crystal device, the display of the external display liquid crystal device becomes dim and becomes difficult to see, or nearly invisible.

At this point, since the voltage of the battery power source 102 is in a domain higher than the threshold voltage $V_L$ of the lamp and higher than the threshold voltage $V_D$ of the transcribing liquid crystal device 105, the data can be transcribed effectively.

Since the photographer realizes that the battery power source 102 is getting low when the display of the external display liquid crystal device 103 becomes dim and difficult to see, correct data can be transcribed continually by the photographer replacing the battery power source 102.

The example described above was based on the premise that the threshold voltage $V_L$ of the lamp 106 is usually higher than the threshold voltage $V_1$ of the external display liquid crystal device when the resistor 104 is not inserted. If the voltages can easily be set so that $V_1 > V_L$, the resistor 104 becomes unnecessary.

In addition, the threshold voltage $V_D$ of the transcribing liquid crystal display 105 and the threshold voltage $V_L$ of the lamp 106 do not necessarily have to have the relationship shown in FIG. 5. The relationship of $V_D$ and $V_L$ may be reversed. The essential condition of the present invention is that the threshold voltage of the external display liquid crystal device 103 must be higher than the threshold voltages $V_D$ and $V_L$ of the transcribing liquid crystal device 105 and the lamp 106.

Consistent with $V_1$ (or $V_2$) $> V_L$ and $V_1$ (or $V_2$) $> V_D$, the external display liquid crystal device 103 may be changed to a light emitting diode (LED) or an electro-chromic device (ECD). The lamp 106 may be changed to a light emitting diode (LED), and the transcribing liquid crystal device 105 may be changed to an electro-chromic device (ECD).

In the above example, it was stated that the external display is performed by a liquid crystal device 103 and the data transcription is accomplished by the light from the lamp 106 that passes through a separate liquid crystal device 105, but the present invention is not limited to the above example. The data transcribing device may be confined to simply a light emitting device. For example, part of the light emitting diodes among a plurality of light emitting diodes arranged in a line that correspond to English characters (JAN, FEB, etc.) and numbers (date) may be caused to emit light and transcribe the data onto film. Also, the data transcribing device may comprise a light emitting device (such as a lamp or light emitting diode) and a data-defining component that is not powered by the battery power source 102 (for example, a data board which is light permeable only on the data portion). An example of this alternate type of construction is described hereafter. The data transcribing devices define indicia to be read by a user.

Figure 6:
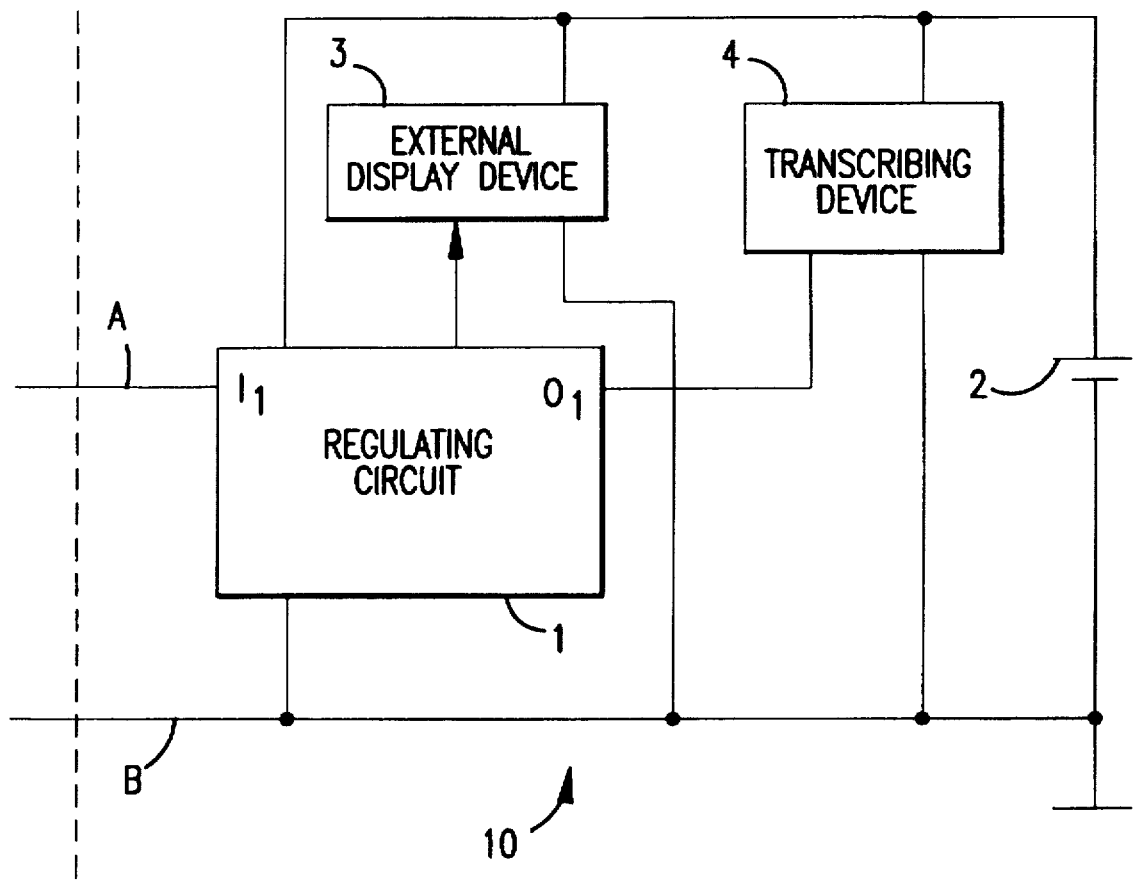
FIG. 6 is a block diagram showing the construction of a data transcribing device according to an embodiment of the present invention.

FIG. 6 is a block diagram showing the internal construction of a data transcribing device 10. Since the camera-side construction is the same as is shown to the left of the dashed line L in FIG. 1, that portion is not illustrated in FIG. 6.

In FIG. 6, the regulating circuit 1 of the data transcribing device 10 is powered by the battery power source 2. The regulating circuit 1 operates sequentially as shown by the flow chart of FIG. 7. A transcribing signal line A connects the input port $I_1$ of the regulating circuit 1 of FIG. 6 to the collector of the NPN transistor 205 in FIG. 1. A transcribing signal is input, and a transcription commencement signal matching the data or a transcription signal that causes the light emitting device to emit light and a transcription stopping signal are output to the transcribing device 4.

The external display device 3 is an external display liquid crystal device like device 103 of FIG. 1, a light emitting diode (LED) or an electro-chromic device (ECD), and is powered by the battery power source 2. The external display device 3 is controlled by an output signal (display signal) from the regulating circuit.

A transcribing device 4 comprises a plurality of light emitting diodes arranged in a line as described above or a data board on which only the data portion is light permeable in conjunction with a light emitting device (lamp or LED). This transcribing device 4 is also powered by the battery power source 2. Triggered by a transcription commencement signal from the output port $O_1$ of the regulating circuit 1, the light emitting diode or other light emitting device emits light and the data is transcribed to film.

Figure 7:
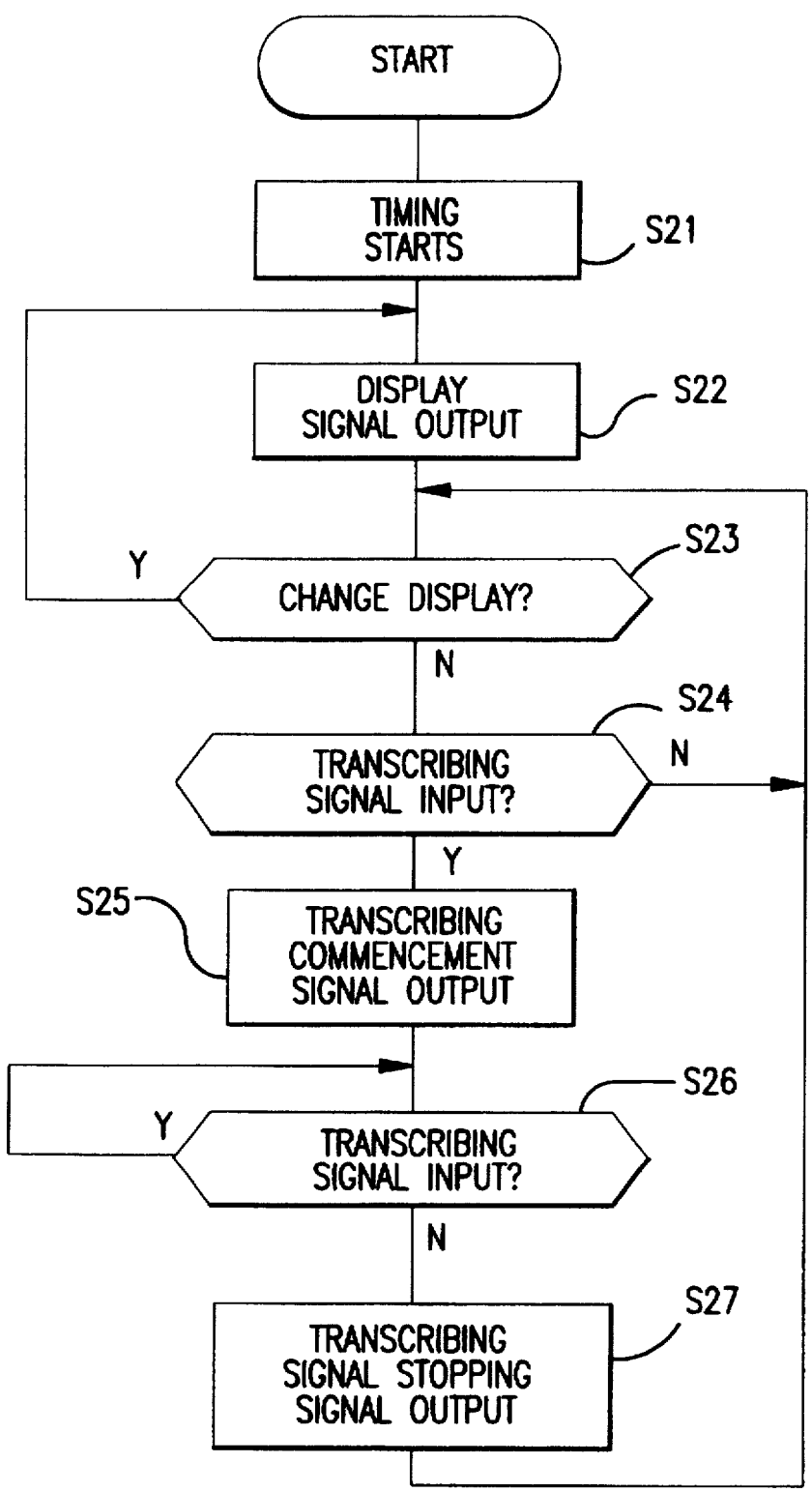
FIG. 7 is a flow chart showing the operating sequence of the regulating circuit of FIG. 6.

FIG. 7 is a flow chart showing the operation of the regulating circuit 1 of FIG. 6. The action of the data transcribing device 10 is described in reference to this flow chart.

The program starts when a battery power source 2 is installed into the transcribing device 10. The timing begins as shown in step S21 of FIG. 7, the program advances to step S22, and a display signal is output to the external display device 3. This output is maintained until the output of the next display signal. The external display device 3 carries out a fixed display according to the display signal.

The program next advances to step S23 and determines from the timing of step S21 whether it is necessary to change the display. If it is necessary to change the display, the program returns to step S22 and outputs a new display signal to the external display device 3. If it is not necessary to change the display, the program advances to step S24 and determines from the high-level or low-level state of the input port $I_1$ whether the transcribing signal is being input.

If it is determined that the input port $I_1$ is at the high-level state because a transcribing signal is not being input, the program returns to step S23; if it is determined that the input port $I_1$ is at the low-level state because a transcribing signal is being input, the program advances to step S25. When the transcribing device 4 comprises the above-mentioned plurality of light emitting diodes, a transcription commencement signal matching the data is output to the transcribing device 4. The light emitting diodes of the transcribing device 4 light and the data is transcribed onto the film. Alternatively, when the transcribing device 4 comprises a light emitting device and the above-mentioned data board, the transcription commencement signal that causes the light emitting device to emit light is also output to the transcribing device 4, by which the light emitting device emits light and the data is transcribed onto film.

The program next advances to step S26 and, as in step S24, determines whether the transcribing signal is being input. If the transcribing signal is being input, the program returns stops at step S26; if the transcribing signal is not being input, the program advances to step S27 and outputs a transcription stopping signal to the transcribing device 4. Triggered by this output, the transcription of the data onto film by the transcribing device 4 is stopped. After the above-mentioned output, the program returns to step S23.

The above comprises the action of the data transcribing device 10. In the same way as described for the operation of FIG. 1 above, a transcribing signal from the camera 200 is output to the data transcribing device 10 at the same time that photography is being performed by turning on the release switch 203 of the camera 200. During the interval of this output, the data transcribing device 10 transcribes the data to film through the transcribing device 4.

The operating characteristics of the external display device 3 and the transcribing device 4 with respect to the voltage of the battery power source 2 are next described.

Figure 8:
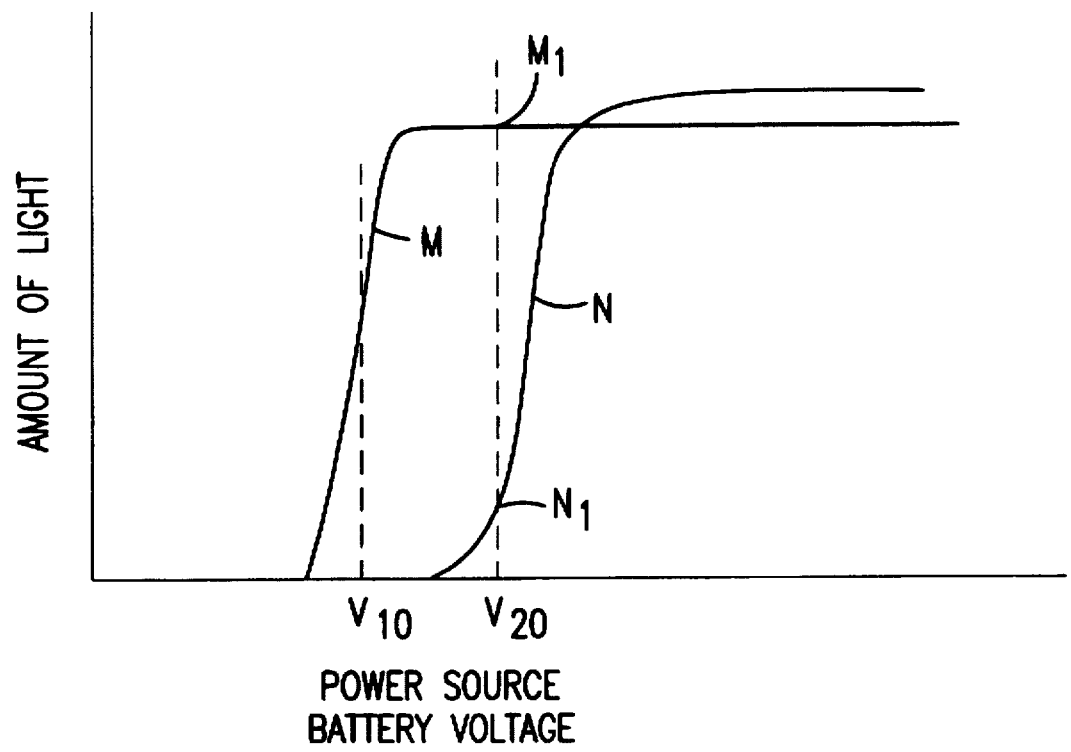
FIG. 8 is a graph showing the relationship between the external display device and the transcribing device, i.e., the light emitting device of FIG. 6 and the voltage of the battery power source. The operating characteristics are shown for the case in which the driving threshold level of the external display device is higher than the driving threshold level of the transcribing device.

FIG. 8 is a graph showing the relationship between the amount of transcribing light of the transcribing device 4 and the voltage of the battery power source 2 and between the contrast of the external display device 3 and the voltage of the battery power source 2. The curved line M is the characteristic line showing the relationship between the amount of transcribing light from the transcribing device 4 and the voltage of the battery power source 2. The curved line N is the characteristic line showing the relationship between contrast of the external display device 3 and the voltage of the battery power source 2.

The battery power source 2 voltage level at the point where the amount of transcribed (in this case, emitted) light is 50% of the maximum amount of transcribing light of the transcribing device 4 is shown as threshold voltage $V_{10}$ in FIG. 8. The battery power source 2 level at the point where the contrast condition is 10% of the maximum display contrast of the external display device 3 is shown as threshold voltage $V_{20}$.

If the voltage of the battery power source 2 drops to the threshold voltage $V_{20}$, as shown by $N_1$ at the point on line N that corresponds to voltage $V_{20}$, the display contrast of the external display device 3 virtually disappears and the display becomes difficult to read. The amount of transcribing light from the transcribing device 4 at this point, as shown by $M_1$ at the point on line M that corresponds to voltage $V_{20}$, is at the fixed amount of transcribing light, and since the voltage of the battery power source 2 exists at a higher domain than the threshold voltage $V_{10}$ of the transcribing device 4, the data can be correctly transcribed at this voltage domain.

The photographer realizes through the dimness of the display described above that it is necessary to change the battery power source 2. The transcription at this point is still being carried out effectively, but if the battery power source 2 is replaced, the correct data transcription can be carried out continually without transcription failure.

According the above embodiment, the light emitting device of FIG. 1 was a lamp 106, but, for example, a light emitting diode may be used in place of the lamp 106, and the data may be transcribed to the film according to the light emitted from the light emitting diode that passes through the transcribing liquid crystal display 105. In this case, the driving threshold level of the external display liquid crystal device 103 is set to be higher than the driving threshold levels of the above-mentioned liquid crystal device 105 and the light emitting diode. This, too, is in accordance with the present invention.

Furthermore, as long as the relationship of the above-mentioned threshold voltages is such that $V_1$ (or $V_2$)$>V_L$ and $V_1$ (or $V_2$)$>V_D$, it is obvious that the external display liquid crystal device 103 may be replaced by an LED or ECD, the lamp 106 may be replaced by an LED, and the transcribing liquid crystal device 105 may be replaced by an ECD.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A data transcribing device for a camera that records images on a recording medium in the camera, comprising:

a power source;

an external display device powered by the power source, said external display device providing a display on an exterior of the camera, the display being clearly readable only when a driving voltage supplied to said external display device by said power source is more than a threshold driving voltage level of the external display device; and a light source powered by the power source, said light source supplying light to the recording medium for transcription of data onto the recording medium, the light from the light source providing reliable transcription of the data onto the recording medium only when the driving voltage supplied to said light source by said power source is more than a threshold driving voltage level of the light source, wherein said threshold driving voltage of said external display device is higher than said threshold driving voltage of said light source.

2. The data transcribing device of claim 1, wherein said power source is a battery.

3. The data transcribing device of claim 1, further comprising a driver device between said power source and said light source, said driver device providing said driving voltage to said light source.

4. The data transcribing device of claim 3, wherein said driving voltage supplied by said driver device is a temporary voltage for constant intensity operation of the light source, said temporary voltage being less than said first threshold driving voltage.

5. The data transcribing device of claim 1, wherein said external display device is a liquid crystal display.

6. The data transcription device of claim 5, wherein said liquid crystal display is a reflective-type liquid crystal display.

7. The data transcription device of claim 1, further comprising a threshold setting device coupled between said external display device and said power source, said threshold setting device causing said threshold voltage level of said external display to be more than said threshold voltage level of said light source.

8. The data transcribing device of claim 7, wherein said threshold setting device includes a resistive element.

9. The data transcribing device of claim 1, further comprising a data-defining component between said light source and the recording medium, said data-defining component forming the light provided by said light source into indicia that is transcribed onto the recording medium.

10. The data transcribing device of claim 9, wherein:
the data-defining component is powered by the power source and which allows enough light from the light source to pass through the data-defining component to provide reliable transcription of the data onto the recording medium only when the voltage supplied by said power source to said data-defining component is more than a threshold driving voltage level of said data-defining component; and
the threshold driving voltage of said external display device is higher than said threshold driving voltage of said data-defining component.

11. The data transcribing device of claim 10, wherein the data-defining component includes a liquid crystal device.

12. The data transcription device of claim 10, wherein said external display device is a reflective-type liquid crystal display, said light emitting device is a lamp, and said data-defining component is a light transmissive liquid crystal display.

13. A data transcribing device for a camera that records images on a recording medium in the camera, comprising:
power supplying means;
external display means for displaying on an exterior of the camera, data to be transcribed on the recording medium, the display being clearly readable only when a driving voltage supplied by said power supply means to said external display means is more than a threshold driving voltage level of said external display means, said external display means being powered by the power supplying means; and
transcribing means, powered by the power supplying means, said transcribing means for transcribing the data onto the recording medium and including original light means for sourcing light, the light from said light means providing reliable recording of the data onto the recording medium of the camera only when the voltage supplied to said transcribing means is more than a threshold driving voltage level of said transcribing means,
wherein said threshold driving voltage of said external display means is higher than said threshold driving voltage of said transcribing means.

14. The data transcribing device of claim 13, wherein the transcribing means includes data-defining means for forming the light emitted from said light emitting means into indicia that is recorded on said recording medium, said data-defining means being powered by the power supply means and allowing enough light from the light emitting means to pass to the recording medium to provide reliable recording of the data onto the recording medium only when the voltage supplied to said data-defining means is more than a third threshold driving voltage level of said data-defining means, and
wherein said threshold driving voltage of said external display means is higher than said threshold driving voltage of said transcribing means.

15. The data transcribing device of claim 13, further comprising driver means for providing a temporary voltage for constant intensity operation of the light means, said temporary voltage being less than said first threshold driving voltage.

16. The data transcribing device of claim 13, further comprising threshold setting means for causing said first threshold voltage to be more than said second threshold voltage.

17. A method of controlling a data transcribing device of a camera that records images onto a recording medium, said camera including a power source, an external display device powered by the power source, said external display device providing a display on an exterior of the camera that is readable by a user, the display being readable only when the driving voltage supplied by the power source to said external display device is greater than a threshold driving voltage level of said display and a light source powered by the power source, said light source supplying light to the recording medium for transcribing data onto the recording medium, said light source providing reliable recording of the data onto the recording medium only when the driving voltage supplied to the light source is more than a threshold level of said light source, said method including the step of:
controlling the threshold driving voltage of said external display device so that said threshold driving voltage of said external display device is higher than said threshold driving voltage of said light source so that said external display device becomes unreadable before said light source becomes unreliable for data recording.

18. The method of claim 17, wherein the data transcribing device includes a data-defining component between said light source in the recording medium, said data-defining component forming the light provided by the light source into indicia that is recorded onto the recording medium, said data-defining component being powered by the power source and allowing reliable recording of the data onto the recording medium only when the voltage supply to said data-defining component is more than a threshold driving voltage level of said data-defining component, further comprising the step of:
controlling the threshold driving voltage of said external display device so that said threshold driving voltage of said external display device is higher than said a threshold driving voltage of said data-defining component so that said external display device becomes unreadable before said data-defining component becomes unreliable for data recording.

19. The method of claim 17, wherein the step of controlling the first threshold voltage level includes controlling a resistance of a power supply path between the power source and the external display device to increase the first threshold voltage level above said second threshold voltage level.

* * * * *